United States Patent

Carter

[15] 3,688,932
[45] Sept. 5, 1972

[54] VERTICALLY ADJUSTABLE STRADDLE TYPE CART

[72] Inventor: Marvin V. Carter, Rte. 1, Troy, Ala. 36081

[22] Filed: May 14, 1971

[21] Appl. No.: 143,385

[52] U.S. Cl.................214/394, 187/8.71, 254/10 R
[51] Int. Cl. .............................................B60p 1/64
[58] Field of Search......214/390, 392, 394, 396, 512, 214/DIG. 10; 254/10.2, 10 R, 10.4, 10.6; 212/8, 9; 187/8.71

[56] References Cited

UNITED STATES PATENTS 2,853,308  9/1958  Schramm.............214/394 X
3,237,798  3/1966  Hampl....................214/394

*Primary Examiner*—Albert J. Makay
*Attorney*—Marcus L. Bates

[57] ABSTRACT

A straddle type cart for transporting a container or the like, wherein the cart is attached to a prime mover and driven into overlying relationship with respect to the container to be transported. The chassis of the cart is in the form of a polygon and includes spaced apart downwardly depending strut members, a frame, and power means associated therewith which is adapted to change the configuration of the chassis from a square to a parallelogram in order to move a main upper beam of the chassis in a vertical direction, thereby enabling a load attached to the cart to be vertically lifted or lowered by the pivotal action of the structure of the cart.

Latch means affix adjacent sides of the polygon to each other in a manner to maintain the cart in affixed elevated upright position. The power means is located between and affixed to adjacent sides of the polygon and control the relative angles thereof, to thereby bring about the before recited lifting action.

9 Claims, 5 Drawing Figures

Patented Sept. 5, 1972
3,688,932
2 Sheets-Sheet 1
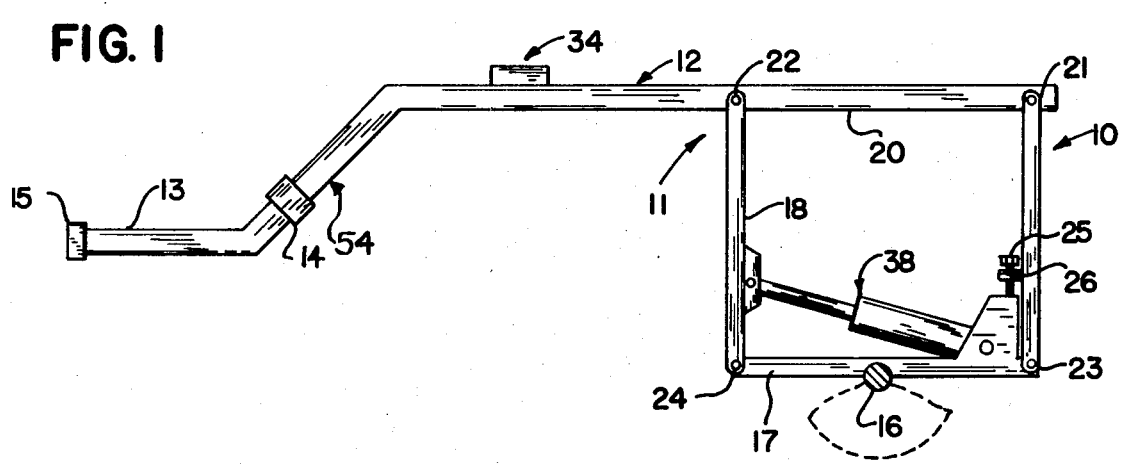
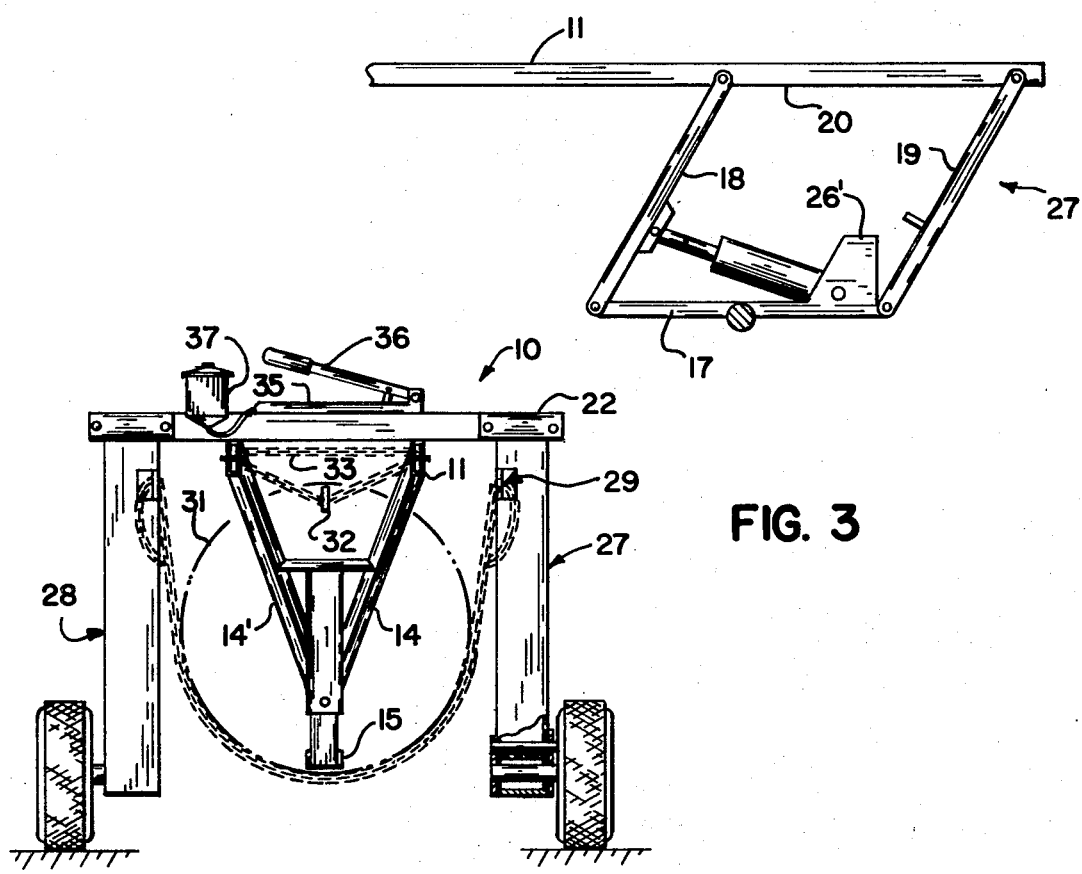
INVENTOR.
MARVIN V. CARTER
BY MARCUS L. BATES
HIS AGENT

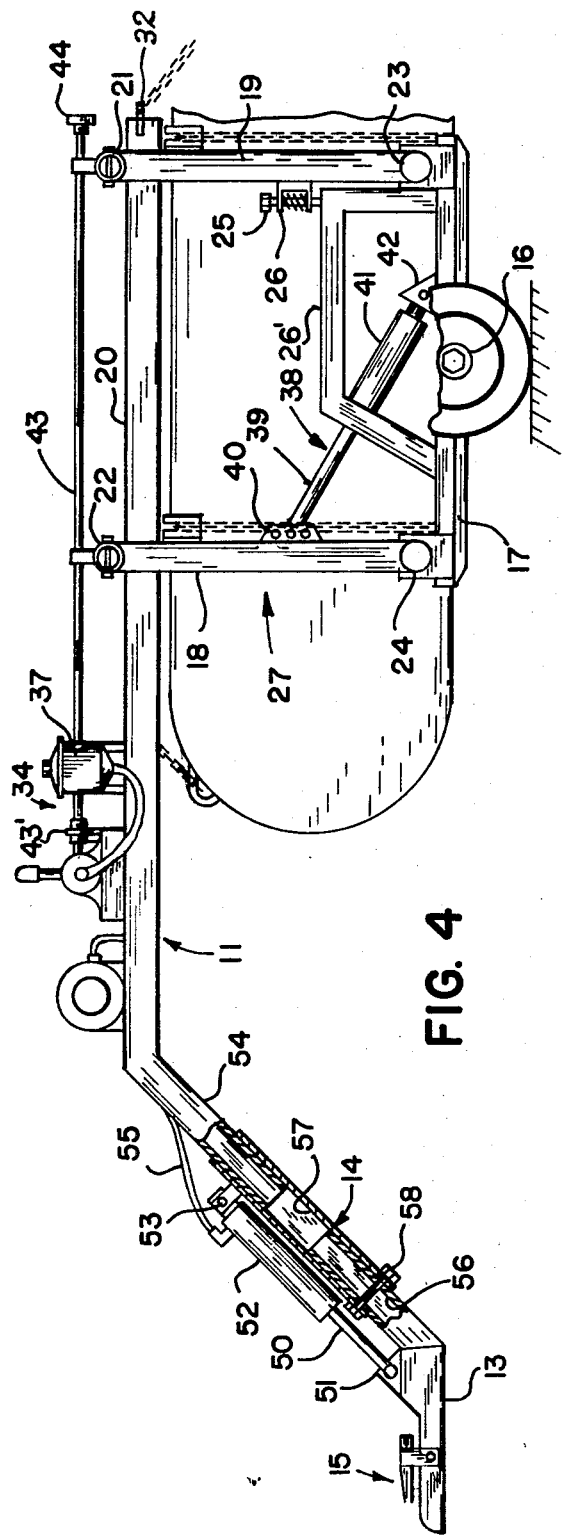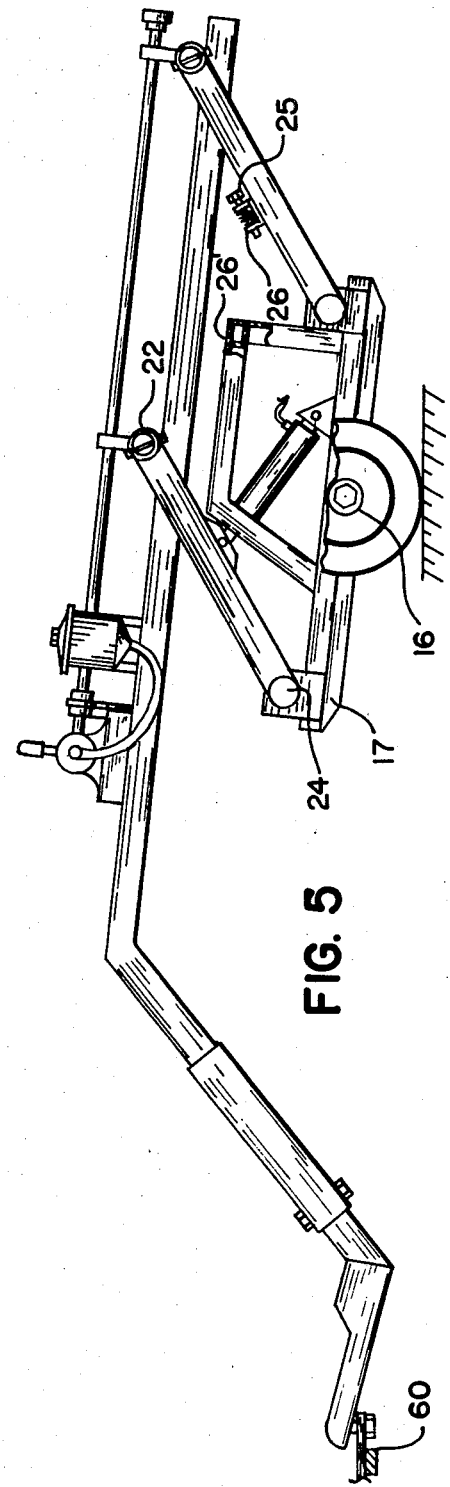

VERTICALLY ADJUSTABLE STRADDLE TYPE CART

BACKGROUND OF THE INVENTION

Straddle type trailers and carts adapted to transport elongated bundles of material or bulky tanks are known to those skilled in the art as evidenced by the patents to Schramm U.S. Pat. No. 2,853,308 and Hample U.S. Pat. No. 3,237,798, to which reference is made for further background of this invention.

It is desirable to have a three point suspension straddle type cart which can be removably connected to a conventional hitch or drawbar of a conventional prime mover, such as a pickup truck. It is also desirable that such a cart be rugged in design and provide a maximum tunnel or inside usable load carrying area commensurate with local and federal highway rules and regulations.

It is furthermore desirable that the cart be fabricated in such a manner to be completely operable by a single person, as for example, the vehicle driver. The struts which transfer the load from the structure of the chassis into the axel and wheels must be sufficiently strong to prevent lateral movement of the structure when substantial sideloads are imposed upon the cart. Furthermore, it is desirable to have a cart of the above described type which is easily handled and can be rapidly loaded or unloaded in an improved and more efficient manner.

It is particularly desirable that the cart be sufficiently rugged in design and simple in operation to enable a single operator to transport propane tanks and the like, from one location to another.

SUMMARY OF THE INVENTION

This invention relates to a trailer, and specifically to a straddle type cart for transporting bulky objects such as containers or integrated loads. The cart is comprised of a chassis which includes two spaced apart parallel main load carrying upper beams and two lateral cross brace members having spaced apart journal means attached to each end thereof. A pair of downwardly depending struts are affixed to and include the journals on each end of the lateral cross brace beams. A second journal is affixed to the lower end of the struts and pivotally attached to a wheel supporting frame member so as to provide a polygon shaped strut member having four sides. The polygon can be controllably changed in configuration from a square into a parallelogram, and vice versa. Latch means associated with a strut leg and the frame member maintains the cart in an elevated upright position. Power means associated with the remaining strut leg and another portion of the frame member provides means by which the chassis can be lowered into proximity of the ground for loading and unloading, or elevated into an upright load carrying position.

A primary object of this invention is to provide an improved straddle type cart for transporting loads such as containers and the like.

Another object of this invention is to provide a straddle type cart having spaced apart pivotal support struts, which, when moved, changes the configuration from a square into a parallelogram.

A further object of this invention is to provide a straddle type cart having a polygon shaped chassis comprised of parallel main load carrying upper beams, lateral cross beams, pivotally mounted struts, and an axel supporting frame, all of which are movably attached to form a square or a parallelogram. A portion of a strut and a portion of the frame is provided with latch means to rigidly secure the cart in the elevated position.

A still further object of this invention is to provide an improved cart having a chassis comprised of elongated load carrying parallel beams supported by polygon shaped struts, with each strut transferring the load from a frame member, and with the frame member being supported by wheels so that the struts can be pivoted from a square configuration into the configuration of a parallelogram, thereby adjustably moving the parallel beams in a vertical direction.

An additional object of the invention is to provide a simplified straddle type trailer design that provides a maximum usable load carrying tunnel as compared to the outside dimensions, and which mechanically lifts and lowers the load.

Another and still further object of this invention is the provision of an improved trailer design that provides a hitch which is vertically adjustable with respect to the ground.

The above objects are attained in accordance with the present invention by the provision of a combination of elements which are fabricated in a manner substantially as described in the above abstract and summary. These and various other objects and advantages will become readily apparent to those skilled in the art upon reading the following detailed description and claims and by referring to the accompanying drawings.

BRIEF DESCRIPTION OF THE DRAWINGS

FIG. 1 is an elevational, part diagrammatical view of the present invention;

FIG. 2 is a broken, schematical representation which shows the apparatus of FIG. 1 as being in an alternate operative configuration, and which sets forth the essence of the present invention;

FIG. 3 is a detailed end view of a cart made in accordance with the present invention;

FIG. 4 is a side elevational view of the cart seen in Figure 3, and

FIG. 5 is essentially the same as Figure 4, but illustrates the cart as it appears when moved into a retracted position.

DETAILED DESCRIPTION OF THE PREFERRED EMBODIMENT

FIGS. 1 and 2 broadly disclose a straddle type cart, generally indicated by the arrow at numeral 10, fabricated in accordance with the present invention, and adapted to be suspended from a conventional hitch and towed by a conventional prime mover. The cart is seen to be comprised of a chassis 11, which is made up of two spaced apart parallel upper beams, one of which is seen at 12. Each upper main support beam includes an elongated first portion which downwardly turns for a limited distance at 14 so as to provide a vertical adjustment means 14' which enables the cart to be removably attached to almost any height conventional vehicle. Horizontal tongue portion 13 is arranged parallel to horizontal member 12 and includes a conventional hitch 15 attached to the marginal free depending terminal end thereof.

Axel 16 bottom supports frame member 17 which in turn bottom supports parallel legs 18 and 19. A marginal longitudinal length 20 of an upper beam 12 is disposed parallel to the before mentioned frame member. Journal means 21, 22, 23, and 24; respectively; connect together members 19, 20; 18, 20; 17, 19; and 17, 18, respectively. Hence legs 18 and 19, along with frame member 17, cooperate together to form a strut assembly which bottom supports one of the upper beams from the illustrated wheel. Each spaced apart frame member is provided with such a strut assembly.

Since members 17, 20 are parallel to one another, and members 18, 19 are parallel to one another, the four coacting members cooperate together to form the square strut configuration set forth in the illustrated embodiment of FIG. 1. The square or polygon of FIG. 1 can be changed into the configuration of a parallelogram, as will be appreciated later on in this disclosure.

A latch means, comprised of a removable pin member 25, a pin guide means 26, and an apertured upstanding member 26' cooperate together and locks and secures the chassis in an upright load carrying position. Latch pin 25 is lifted out of engagement with the aperture at 26' in order to release a strut leg from the frame member, thereby enabling the chassis to be controllably collapsed into the loading and unloading position of FIGS. 2 and 5. The illustrated biasing means can be incorporated into the latching apparatus if deemed desirable.

As particularly illustrated in the preferred embodiment of FIGS. 3–5, spaced apart laterally arranged cross-brace members define the limited length of upper beam 20. Journal means 22 and 22' are affixed to the opposed marginal end portions of the cross-brace members so as to provide an elongated bearing surface which admits low friction pivotal rotation of one end of the strut leg 18 thereabout. The rear cross-brace member likewise accommodates spaced apart journal means, one of which is seen illustrated at 21. The cross-brace members, cart frame member, journal or pivot means, and spaced apart strut legs in their entirety, cooperate together to form a unitized movable strut assembly for supporting the spaced apart parallel upper beams from the axel.

A fastener means 29, which can take on several different forms, is attached to each leg of the strut assemblies for engaging the illustrated chain therewithin. A load 31, which for purposes of illustration is shown to be in the form of a propane tank, has a rear attachment point 32' affixed thereto which cooperates with fastener means 32 for receiving chain 33 therethrough in order to secure the tank to the main load carrying members.

A hydraulic pressure control system, generally indicated by the arrow at numeral 34, includes hydraulic pump 35 which is actuated by means of handle 36 in a known and conventional manner. Reservoir 37 acts as a surge tank and precludes ingestion of air into the system.

As more clearly illustrated in FIGS. 4 and 5, there is provided a hydraulic cylinder assembly 38 which includes the usual and conventional piston 39. The free depending end of the piston is adjustably attached to web portion 40 which in turn is attached to a vertical leg of the strut. The free depending end of the cylinder 41 is attached to web 42 which in turn is affixed to the axel carrying member of the frame.

Shaft or rod 43 can be manipulated by handle 44 so as to control the flow of fluid to and from the hydraulic cylinder assembly through cross-over valve means 43'.

As best seen in FIG. 4, the inclined portion of the chassis at 14 includes the illustrated telescoping coacting members which enables tongue member 13 to be moved towards and away from member 12. Removal of pin 58 permits portion 56 to be telescopingly moved into member 57 and towards member 12 so as to attain vertical adjustment of hitch 15 relative to ground level. As noted, the adjusting operation can be accomplished with a small hydraulically operated cylinder assembly affixed to web members 51 ad 53. Hydraulic manipulation of piston 50 within cylinder 52 either raises or lowers hitch 15 to the desired height.

In operation, the hitch is attached to a drawbar 60 of a conventional vehicle (not shown), and with the apparatus in the configuration of FIG. 4, the cart is moved along the ground and into overlying position with respect to a load. The pin of the latch means is pulled upwardly against the illustrated biasing means so as to withdraw the lower marginal portion of the pin from the apertured member at 26'. This action causes leg 19 to be released from member 17. The handle 44 is next turned to move valve 43' to the flow permitting position, whereupon the chassis is pivoted into the illustrated configuration of FIGS. 2 and 5. As hydraulic piston 39 is retracted into cylinder 41 the upper beams of the chassis move downward into proximity of the load, whereupon the load can be attached to the load supporting members and strut legs at 29 by any convenient and suitable means, including the illustrated quick disconnect chains. The valve is next shifted to an alternate flow position, and the hydraulic pump is again actuated so as to cause the hydraulic piston 39 to force strut leg 18 and frame member 17 apart, that is, to change the acute and obtruse angles of the strut assembly to right angles with the frame while simultaneously moving the upper longitudinal members in an upward direction, thereby lifting the securely attached load free of the ground. Once the chassis has been returned to the square configuration of FIGS. 1 and 4, the latch means is returned to the locked position and the load safely can be transported to another location as desired.

Upon reaching the new location where the load is to be deposited, and after releasing the latch, the load is gently lowered into proximity of the ground or other supporting surface by manipulation of the valve, which again hydraulically collapses the chassis from the square or upright configuration of FIG. 4 into the retracted configuration of FIG. 5, in the same before described manner. The attachment means supporting and securing the load to the chassis is disengaged from the load, and the chassis returned to the square configuration of FIG. 4 by proper manipulation of the hydraulic system. It will be appreciated that the employment of strut assemblies that will pivot into the configuration of a parallelogram by means of the illustrated journals provides a rigid structure which does not "hunt" due to lateral forces being imposed thereon or to accumulative lost motion between wear surfaces.

Furthermore, when the apparatus of FIG. 5 is returned to the configuration of FIG. 4, the latch means need not be massive and complex because the longitudinal force placed on the legs of the strut assemblies is usually extremely small as compared to the vertical and lateral loads.

It is contemplated that the upstanding portion of the frame member can be built up of angles or squares similar to that of FIGS. 4 and 5; or, alternatively, can be an integral plate-like structure such as schematically seen illustrated in FIGS. 1 and 2. Moreover, the specific latch means employed to maintain the strut leg affixed to the frame member can take on several different forms, but preferably is of a design which will positively remain in the latched or unlatched position, as desired, so as to enable a single operator to manipulate the entire apparatus. Those skilled in the art will appreciate that incorporation of a latch means on either or both sides of the cart frame is contemplated and is encompassed in this invention.

I claim:

1. A straddle type cart for transporting a container or the like, comprising a chassis;

said chassis including spaced apart upper beams, each having spaced apart journal means attached thereto;

means forming a downwardly depending strut; said strut including spaced apart legs and a frame member, with one said leg being attached to one said journal means, each leg having a swing end and a pivot end with said swing end adapted to swing in an arcuate manner about said pivot end;

journal means at each swing end of each leg;

said frame member having the ends thereof affixed to said journal means of the swing end of the legs of one of said struts;

wheel means; means by which said wheel means are rotatably affixed to said frame member;

an upstanding member attached to said frame member; releasable latch means attached to one of said legs, said latch means adapted to releasably affix the last said leg to said upstanding member when said leg to which said latch means is attached is pivotally moved into engagement therewith, whereby:

said latch means, when engaged with said upstanding member, maintains said upper beams in an elevated position relative to said frame member, and, when unlatched, permits the legs to pivot to thereby lower said upper beams into a lower position relative to said frame member.

2. The cart of claim 1 and further including means attached to a leg of one strut and to the frame member for controlling the angle therebetween to thereby raise and lower said upper beams relative to the frame.

3. The cart of claim 2, and further including means for securing and supporting a load from said upper beams and said strut legs: whereby, the load is lifted when said upper beams are raised; and, the load is lowered when said upper beams are lowered relative to the frame member.

4. The cart of claim 2 wherein said means for controlling the angle between a leg of one strut and the frame member includes a hydraulic cylinder and piston assembly having the free depending end of said piston connected to said leg, and the free end of said cylinder connected to said frame; and further including a hydraulic pump and valve means connected together by flow conduit means for controlling flow of fluid to and from the hydraulic cylinder.

5. The cart of claim 1 wherein said spaced apart upper beams lie in a common plane; and said beams being formed in two sections, with adjustment means being interposed between the recited sections, and further including means forming a hitch at one end of said chassis.

6. The cart of claim 1 wherein said strut legs together with said frame member and part of one said upper beam is in the form of a polygon; said polygon being arranged with respect to said latch means and said power means whereby said wheels move toward said hitch when the upper beams are lowered toward the wheels.

7. The cart of claim 1 wherein said spaced apart struts together with said spaced apart upper beams form an inverted U-shaped tunnel through which the load may pass as the cart is moved over the load.

8. The cart of claim 1 wherein said upper beams are in the form of two spaced apart members lying in a common plane, said plane being broken by and connected together by an adjustment means.

9. The cart of claim 1 wherein said frame member includes diametrically opposed outwardly directed axels attached thereto, means by which said wheels are attached to said axels;

said strut legs together with said frame member and part of one said upper beam being in the form of a polygon;

said polygon being in the configuration of a square when the upper beams are in the elevated position relative to the wheels;

said polygon being in the configuration of a parallelogram when the upper beams are in the lowered position relative to the wheels.

* * * * *